United States Patent Office 3,370,043
Patented Feb. 20, 1968

3,370,043
METHOD FOR PREPARING UNSATURATED POLYESTERS
John G. Milligan, Austin, Tex., assignor to Jefferson Chemical Company, Inc., Houston, Tex., a corporation of Delaware
No Drawing. Filed Mar. 2, 1964, Ser. No. 348,803
4 Claims. (Cl. 260—75)

This invention relates to a method for the production of unsaturated polymeric polyesters. More particularly, this invention relates to a method for the preparation of active unsaturated polymeric polyesters from maleic anhydride and oxirane compounds.

Processes for the preparation of polyester resins by the reaction of organic acid anhydrides with oxirane compounds have been described, for example, in United States Patent No. 2,779,783 and in copending application Serial No. 336,010 filed January 6, 1964, and entitled "Method of Preparing Linear Polyesters." These processes are conducted at temperatures usually not exceeding 150° C. In general, the preparation of unsaturated polyesters by the use of maleic anhydride in these low-temperature processes results in the formation of polyester resins that are not sufficiently active to be satisfactorily cross-linked with vinylic cross-linking agents such as alkyl or aromatic hydrocarbons containing vinyl side chain unsaturation (e.g., styrene, alpha-methylstyrene, vinylnaphthalene, vinyltoluene, etc.) in the usual manner.

In copending application Serial No. 336,011 filed January 6, 1964, and entitled "Olefinically Active Polyesters," there is described a method for increasing the activity of these unsaturated resins which comprises heating the resin at a temperature within the range of about 190° to about 250° C. for a period of time within the range of about one to about five hours. This process suffers from the disadvantages of a high resin color and increased processing cost resulting from prolonged heating of the entire resin batch.

It has now been surprisingly discovered that an easily cross-linked unsaturated polyester resin can be obtained by a two-step process which comprises heating a mixture of maleic anhydride and a dihydric alcohol at a temperature of from about 190° to about 250° C. to form an intermediate ester of high acid number as compared to a finished resin, such as, for example, an acid number of 60 or higher, and then further reacting the intermediate ester with additional acid anhydride and an oxirane compound in the presence of a catalyst which promotes the carboxyl-oxirane reaction. The high temperatures employed in the first step of the process result in the activation of the double bond so that the final resin is more easily cross-linked.

The instant process offers several advantages over prior art processes for the preparation of active unsaturated polyester resins. For example, only part of the total ingredients is subjected to the time-consuming high temperature activation step, thereby reducing kettle time for a resin batch. Further, the activation step takes place faster at the high acid number of the intermediate ester, again resulting in reduced kettle time. These savings in kettle time result in a lower processing cost and a less expensive resin.

The first step of this process comprises heating maleic anhydride with a dihydric alcohol at a temperature of about 190° to about 250° C. to effect esterification and activation. The reaction time will usually be from about 0.5 to about 4 hours, depending upon the extent to which the reaction is to proceed as will be discussed in more detail hereinbelow.

The dihydric alcohol to be employed in the first step is preferably a 1,2-glycol corresponding to an epoxide of the type described hereinbelow but may also be a higher aliphatic dihydric alcohol such as, for example, 1,4-butanediol, 2-butene-1,4-diol, diethylene glycol, dipropylene glycol, and polyethylene and polypropylene glycols such as, for example, those having molecular weights of about 400.

Activation of the unsaturation does not occur until the maleic anhydride ring has been cleaved by reaction with a hydroxyl group. Since one mol of dihydric alcohol will react with two mols of maleic anhydride, the minimum ratio of dihydric alcohol to maleic anhydride for complete reaction of the anhydride is 1:2. In some cases, it may be desirable to have a ratio more nearly approaching 1:1. The removal of water from such a mixture would then permit the formation of a polymeric intermediate. The degree of polymerization can be controlled by the ratio of dihydric alcohol to maleic anhydride and by the amount of water removed. The molecular weight of the final resin may be controlled by controlling the degree of polymerization in the formation of the intermediate.

In the second step of the process, the intermediate from the first step is further reacted with additional acid anhydride and oxirane compound in the presence of a catalyst which promotes the carboxyl-oxirane reaction. This step of the process is preferably conducted at a temperature within the range from about 80° to about 150° C. The pressure employed is not critical and autogenous pressures may be used. The reaction time will usually be less than about five hours, sufficient to provide a polyester resin having the desired acid number.

The acid anhydride used in the second step of the process may be maleic anhydride; however, at the low temperatures employed in this step there will be little or no activation of the double bond. The preferred anhydride for use in the second step is phthalic anhydride. Other anhydrides that may be employed are aromatic or aliphatic dibasic acid anhydrides which may be saturated or unsaturated. Examples include succinic anhydride, itaconic anhydride, chlorendic anhydride, tetrahydrophthalic anhydride, tetrachlorophthalic anhydride, glutaric anhydride and the corresponding homologues and analogues thereof. Maleic anhydride may comprise from 10–100 mol percent of the total anhydride employed in the process. The preferred amount of maleic anhydride is from about 33 to about 50 mol percent.

The oxirane compound to be utilized in accordance with the present invention is a monoepoxide which contains the epoxide grouping in a terminal position. Thus, the epoxide will have the following formula:

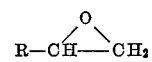

wherein R is hydrogen, a $C_1$–$C_{18}$ alkyl group, an aryl group, a $C_1$–$C_4$ haloalkyl group or mixtures thereof. For example, ethylene oxide, propylene oxide, 1,2-butylene oxide, styrene oxide, epichlorohydrin, dodecene oxide, etc., may be used alone or in admixture.

The catalyst to be employed in the second step of the present invention is a catalyst which substantially selectively promotes the reaction between oxirane groups and carboxyl groups. Acceptable catalysts include alkali metal hydroxides, halides and carbonates, tertiary amines, quaternary ammonium hydroxides and salts, quaternary phosphonium compounds and sulfonium salts. Examples of such catalysts include lithium chloride, sodium carbonate, potassium hydroxide, trimethylamine, triethylamine, ammonium chloride, tetramethylammonium bromide, tetraethylammonium chloride, benzyltrimethylammonium chloride, benzyltrimethylammonium bicarbonate, methyltriphenylphosphonium bromide, triphenylsulfonium chloride and benzyltrimethylammonium hydroxide. In general, the catalyst will constitute from about 0.05 to about 5% by weight of the reaction mixture.

The molar ratio of the dihydric alcohol and oxirane compound combined to the dibasic acid anhydride should be at least about 1:1 and preferably should be slightly greater than this, as, for example, not more than about 1.4:1.

The second step of the process is preferably conducted under anhydrous or substantially anhydrous conditions. Any water present can act as a chain initiator, thereby lowering the molecular weight. If the amount of water present is known, allowance can be made for it so that the molecular weight will not be affected.

The present invention will be further illustrated by the following example, which is not intended to limit the invention in any way.

EXAMPLE I

A mixture of 245.1 g. (2.5 mols) of maleic anhydride and 95 g. (1.25 mols) of propylene glycol was heated 4 hours at 200° C. Three hundred grams of the resulting intermediate ester, 327 g. of phthalic anhydride and 0.47 g. of lithium chloride were placed in a kettle and reacted under nitrogen with 230 g. of propylene oxide at 125° C. The addition of the propylene oxide required 40 minutes and the reaction was continued for an additional 80 minutes. The pressure varied from 10–55 p.s.i.g.

A mixture of 100 g. of the polyester resin, 0.2 g. of 5% hydroquinone in dibutyl phthalate and 50 g. of styrene was prepared and tested. The results were as follows:

| | |
|---|---|
| Gardner color | 3–4 |
| Gardner viscosity | O–P |
| Gel time | 4:49 |
| Cure time | 7:15 |
| Peak exotherm temp., ° C. | 202.7 |
| Barcol hardness | 47 |

The gel time, cure time and peak exotherm temperature were determined utilizing a standard test proposed by the Society of the Plastics Industry. The procedure employed in making the test was as follows:

To a 50 g. weighed (triple-beam balance) resin sample, there was added a slurry of 0.500 g. benzoyl peroxide (purified 99%) in 0.5 ml. styrene. When the catalyst was thoroughly mixed into the resin, an 18 x 150 mm. test tube was filled to a depth of three inches with catalyzed resin. A thermocouple, lightly coated with silicone grease, was centered in the test tube and the assembly placed in a constant temperature bath at 180° F. The resin level was placed below the liquid level of the bath. The temperature of the sample was recorded continuously by a recording potentiometer having a chart speed of one inch per minute. The gel time was taken from the temperature curve and was the time for the sample to reach 90° C. from 65° C. The cure time was the time elapsing between the time the sample reached 65° and the time it reached the maximum temperature. The maximum temperature reached during the polymerization was recorded as the peak exotherm temperature.

Having thus described my invention, what is claimed is:

1. A method for preparing an active unsaturated polyester resin which comprises:
   (A) reacting maleic anhydride with an aliphatic dihydric alcohol at a temperature of from about 190° to about 250° C., and
   (B) further reacting the product so formed with a dibasic organic carboxylic acid anhydride and a terminal oxirane compound formula:

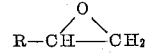

wherein R is selected from the group consisting of hydrogen, a $C_1$–$C_{18}$ alkyl group, an aryl group, a $C_1$–$C_4$ haloalkyl group and mixtures thereof under substantially anhydrous conditions at a temperature of from about 80° to about 150° C. in the presence of a catalyst selected from the group consisting of alkali metal hydroxides, halides and carbonates, tertiary amines, quaternary ammonium hydroxides and salts, quaternary phosphonium compounds and sulfonium salts wherein the molar ratio of the dihydric alcohol and oxirane compound combined to the dibasic acid anhydride is at least about 1:1.

2. A method as in claim 1 wherein the molar ratio of maleic anhydride to aliphatic dihydric alcohol in the first step is within the range of from about 2:1 to about 1:1 and maleic anhydride comprises from about 10 to about 100 mol percent of the total acid anhydride employed.

3. A method as in claim 2 wherein the aliphatic dihydric alcohol is propylene glycol, the terminal oxirane compound is propylene oxide, the dibasic organic carboxylic acid anhydride employed in the second step is phthalic anhydride, the catalyst is lithium chloride and maleic anhydride comprises from about 33 to about 50 mol percent of the total anhydride employed.

4. A method as in claim 3 wherein the catalyst is a quaternary ammonium halide.

References Cited

UNITED STATES PATENTS

| | | | |
|---|---|---|---|
| 3,089,863 | 5/1963 | Hicks et al. | 260—75 |
| 2,720,500 | 10/1955 | Cody | 260—75 |
| 3,213,067 | 10/1965 | Pohl et al. | 260—78.4 |
| 2,779,783 | 1/1957 | Hayes | 260—75 |

WILLIAM H. SHORT, *Primary Examiner.*

SAMUEL H. BLECH, *Examiner.*

R. T. LYON, *Assistant Examiner.*